(12) United States Patent
Kikuchi et al.

(10) Patent No.: US 12,157,803 B2
(45) Date of Patent: Dec. 3, 2024

(54) POLYMER COMPOSITION, CROSSLINKED BODY, AND TIRE

(71) Applicant: ENEOS MATERIALS CORPORATION, Tokyo (JP)

(72) Inventors: Toshimitsu Kikuchi, Tokyo (JP); Hirofumi Senga, Tokyo (JP); Yuto Sakagami, Tokyo (JP); Takuya Sano, Tokyo (JP); Takato Fukumoto, Tokyo (JP); Toshiyuki Hayakawa, Tokyo (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 461 days.

(21) Appl. No.: 17/479,492

(22) Filed: Sep. 20, 2021

(65) Prior Publication Data
US 2022/0098380 A1 Mar. 31, 2022

(30) Foreign Application Priority Data
Sep. 30, 2020 (JP) .................................. 2020-166483

(51) Int. Cl.
| | |
|---|---|
| C08J 9/00 | (2006.01) |
| B60C 1/00 | (2006.01) |
| C08J 9/18 | (2006.01) |
| C08L 9/06 | (2006.01) |

(52) U.S. Cl.
CPC .......... C08J 9/0061 (2013.01); B60C 1/0016 (2013.01); B60C 1/0025 (2013.01); C08J 9/18 (2013.01); C08L 9/06 (2013.01); C08J 2203/22 (2013.01); C08J 2309/06 (2013.01); C08J 2483/04 (2013.01); C08L 2203/14 (2013.01); C08L 2312/08 (2013.01)

(58) Field of Classification Search
CPC ........ C08J 9/0061; C08J 9/18; C08J 2203/22; C08J 2309/06; C08J 2483/04; B60C 1/0016; B60C 1/0025; C08L 9/06; C08L 2203/14; C08L 2312/08
See application file for complete search history.

(56) References Cited

U.S. PATENT DOCUMENTS

| | | | |
|---|---|---|---|
| 4,501,857 A | 2/1985 | Kishimoto et al. | |
| 4,673,714 A | 6/1987 | Kishimoto et al. | |
| 2005/0197466 A9 * | 9/2005 | Stere | C08C 19/02 525/333.2 |
| 2016/0215127 A1 | 7/2016 | Sawada et al. | |

FOREIGN PATENT DOCUMENTS

| | | |
|---|---|---|
| CA | 2496694 A1 * | 3/2004 |
| JP | 63-004841 B2 | 2/1988 |
| JP | 1-37970 B2 | 8/1989 |
| JP | 2-80440 A | 3/1990 |
| JP | 2004256745 A * | 9/2004 |
| JP | 2013-532210 A | 8/2013 |
| WO | WO 2015/064646 A1 | 5/2015 |

OTHER PUBLICATIONS

Extended European Search Report issued Mar. 2, 2022 in European Patent Application No. 21198162.6, 6 pages.
Japanese Office Action mailed Jun. 11, 2024, issued in Japanese Patent Application No. 2020-166483, with machine-generated English Translation, total 6 pages.

* cited by examiner

*Primary Examiner* — K. Boyle
(74) *Attorney, Agent, or Firm* — Oblon, McClelland, Maier & Neustadt, L.L.P.

(57) ABSTRACT

A polymer composition includes a conjugated diene polymer (A) and a compound (B). The compound (B) is at least one compound selected from the group consisting of a polysiloxane compound and a fluorine-containing compound. The conjugated diene polymer (A) contains, when the composition ratios (molar ratios) in the polymer of the structural units represented by formulas (1) to (4) are p, q, r, and s, respectively, a polymer (A-1) satisfying formula (i).

$$0.75 \leq (p+(0.5 \times r))/(p+q+(0.5 \times r)+s) \leq 0.95 \quad \text{Formula (i):}$$

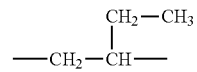

(1)

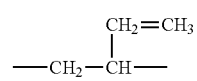

(2)

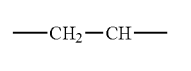

(3)

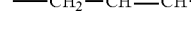

(4)

17 Claims, No Drawings

POLYMER COMPOSITION, CROSSLINKED BODY, AND TIRE

CROSS-REFERENCE TO RELATED APPLICATIONS

The present application is based on Japanese Patent Application No. 2020-166483, filed Sep. 30, 2020, the contents of which are incorporated herein by reference in their entirety.

BACKGROUND OF THE INVENTION

Field of the Invention

The present disclosure relates to a polymer composition, a crosslinked body, and a tire.

Description of the Related Art

Conjugated diene polymers such as styrene-butadiene copolymers exhibit good properties, such as thermal resistance, wear resistance, mechanical strength, and molding processability, and thus have been widely used in various industrial products, such as pneumatic tires, anti-vibration rubber, and hoses. Further, conventionally, it has been proposed to obtain a vulcanized rubber having high strength and low wear by using a hydrogenated conjugated diene polymer in which a part of the unsaturated bonds of the conjugated diene polymer are hydrogenated (for example, WO 2015/064646).

In the production of winter tires and all-season tires, to obtain good grip performance on ice and wet grip performance, polymers having a relatively low glass transition temperature (Tg) are generally used. Therefore, the obtained vulcanized rubber tends to be soft and the wear resistance tends to be insufficient. In view of this, as a rubber material for winter tires or all-season tires, it is conceivable to use a hydrogenated conjugated diene polymer that exhibits high strength and high wear resistance.

However, in general, rubber compositions are sticky in a non-vulcanized state. For this reason, if the rubber composition is designed so that the glass transition temperature of the rubber component is simply lowered for application to winter tires and all-season tires, the rubber composition tends to adhere to equipment and packaging materials during the steps for producing the rubber composition, and the composition tends to adhere to itself. In this case, the handleability of the rubber composition is not good, and productivity may decrease.

The present disclosure has been made in view of the above problems, and a major object of the present disclosure is to provide a polymer composition capable of producing a vulcanized rubber having appropriate adhesiveness, high strength, and good grip performance on ice.

SUMMARY OF THE INVENTION

As a result of investigating how to solve the above problems, the present inventors discovered that the above problems can be solved by combining a specific conjugated diene polymer and a specific additive. According to the present disclosure, the following means are provided.

[1] A polymer composition, including a conjugated diene polymer (A) and a compound (B),
wherein the compound (B) is at least one compound selected from the group consisting of a polysiloxane compound and a fluorine-containing compound, and
wherein the conjugated diene polymer (A) contains, when a composition ratio (molar ratio) in the polymer of a structural unit represented by formula (1), a structural unit represented by formula (2), a structural unit represented by formula (3), and a structural unit represented by formula (4) are p, q, r, and s, respectively, a polymer (A-1) satisfying formula (i):

$$0.75 \leq (p+(0.5 \times r))/(p+q+(0.5 \times r)+s) \leq 0.95 \qquad \text{Formula (i):}$$

[F1]

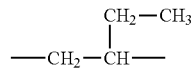  (1)

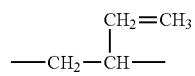  (2)

—CH$_2$—CH—  (3)

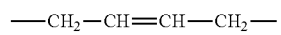  (4)

[2] A crosslinked body obtained by using the polymer composition according to the above [1].

[3] A tire in which one or both of a tread and a sidewall are formed using the polymer composition according to the above [1].

According to the present disclosure, a polymer composition having appropriate adhesiveness can be produced. Further, a vulcanized rubber having high strength and good grip performance on ice can be produced.

DETAILED DESCRIPTION OF THE INVENTION

<Polymer Composition>

A polymer composition of the present disclosure (hereinafter, also simply referred to as "the present composition") contains a conjugated diene polymer (A), and at least one compound selected from the group consisting of a polysiloxane compound and a fluorine-containing compound (hereinafter, also simply referred to as "compound (B)"). Hereinafter, each component included in the present composition and the optionally added components will be described. In addition, in this specification, a numerical range described by using the word "to" between numerical values means that the numerical values described before and after the "to" are included as the lower limit value and the upper limit value.

<Conjugated Diene Polymer (A)>

The present composition includes, as a conjugated diene polymer, when a composition ratio (molar ratio) in the polymer of a structural unit represented by formula (1), a structural unit represented by formula (2), a structural unit represented by formula (3), and a structural unit represented by formula (4) are p, q, r, and s, respectively, a polymer satisfying formula (i) (hereinafter, also referred to as "polymer (A-1)")

$$0.75 \leq (p+(0.5 \times r))/(p+q+(0.5 \times r)+s) \leq 0.95 \qquad \text{Formula (i):}$$

[F2]

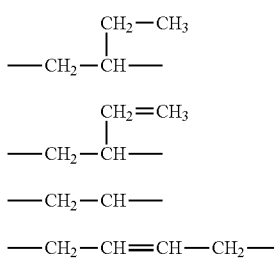

(1)

(2)

(3)

(4)

As the polymer (A-1), a hydrogenated product of a polymer having a structural unit derived from a conjugated diene compound can be used. The polymer (A-1) as a hydrogenated product can be produced by first polymerizing a monomer containing a conjugated diene compound to obtain a non-hydrogenated conjugated diene polymer, and then subjecting the obtained polymer to a hydrogenation reaction.

As the conjugated diene compound constituting the polymer (A-1), 1,3-butadiene can be preferably used. Further, in the polymerization for obtaining the polymer (A-1), a conjugated diene compound other than 1,3-butadiene may be used in addition to 1,3-butadiene. Specific examples of the conjugated diene compound other than 1,3-butadiene include isoprene, 2,3-dimethyl-1,3-butadiene, and 1,3-pentadiene. Among these, isoprene is preferable as the conjugated diene compound other than 1,3-butadiene. The conjugated diene compound may be used singly or in combination of two or more types.

The polymer (A-1) is preferably a copolymer of a conjugated diene compound and an aromatic vinyl compound, from the viewpoint of increasing the strength of the crosslinked body obtained using the present composition. Examples of the aromatic vinyl compound used for the polymerization include styrene, 2-methylstyrene, 3-methylstyrene, 4-methylstyrene, α-methylstyrene, N,N-dimethylaminoethylstyrene, and diphenylethylene. Among these, the aromatic vinyl compound is particularly preferably at least one of styrene and α-methylstyrene. The aromatic vinyl compound can be used singly or in combination of two or more types.

When the polymer (A-1) is a copolymer of a conjugated diene compound and an aromatic vinyl compound, from the viewpoint of having high living properties in anionic polymerization, the polymer (A-1) is preferably, among these, a copolymer of 1,3-butadiene and styrene. From the viewpoint that the dispersibility of a filler to be blended in the polymer composition can be improved, the polymer (A-1) is preferably a random copolymer having an irregular distribution of the conjugated diene compound and the aromatic vinyl compound. The random copolymer of the conjugated diene compound and the aromatic vinyl compound may further have a block moiety composed of the conjugated diene compound or the aromatic vinyl compound, as long as the effects of the present disclosure can be obtained.

In the copolymer of the conjugated diene compound and the aromatic vinyl compound, from the viewpoint of improving strength, wear resistance, and low hysteresis loss properties, and also enhancing grip performance on ice, the content of the structural unit derived from the aromatic vinyl compound is preferably 3 to 45% by mass relative to the total amount of the monomers constituting the copolymer.

From the viewpoint of obtaining a crosslinked body having even better strength, wear resistance, and low hysteresis loss properties, the content of structural unit derived from the aromatic vinyl compound is more preferably 4% by mass or more, and still more preferably 5% by mass or more, relative to the total amount of the monomers constituting the copolymer.

Further, from the perspective of enabling a sufficiently high grip performance on ice, the content of the structural unit derived from the aromatic vinyl compound is preferably 40% by mass or less, more preferably 35% by mass or less, still more preferably 30% by mass or less, and particularly preferably 25% by mass or less, relative to the total amount of the monomers constituting the copolymer. In addition, by setting the content of the aromatic vinyl compound unit within the above range, it is possible to achieve both productivity and strength. The polymer (A-1) includes, based on 100% by mass of the total amount of the monomers constituting the polymer (A-1), preferably 50 to 97% by mass of the 1,3-butadiene unit, 3 to 45% by mass of the aromatic vinyl compound unit, and 0 to 30% by mass of a conjugated diene compound unit other than 1,3-butadiene. Setting to such a blending ratio is preferable because the grip performance on ice can be improved in a well-balanced manner while maintaining the strength of the crosslinked body to a high level.

The conjugated diene compounds and the aromatic vinyl compounds mentioned as examples above all have the same action in that a conjugated diene polymer having an active terminal can be obtained. Therefore, even those compounds not described in the Examples described later can be used in the present disclosure.

In the polymerization, a monomer other than the conjugated diene compound and the aromatic vinyl compound may be used. Examples of another monomer include acrylonitrile, methyl (meth)acrylate, and ethyl (meth)acrylate. The content of the structural unit derived from another monomer is preferably 30% by mass or less, more preferably 20% by mass or less, and still more preferably 10% by mass or less, relative to the total amount of the monomers constituting the polymer (A-1).

The polymerization method for obtaining the polymer (A-1) may be any of a solution polymerization method, a gas phase polymerization method, and a bulk polymerization method. A solution polymerization method is particularly preferable. Further, as the polymerization type, either a batch type or a continuous type may be used. When a solution polymerization method is used, an example of a specific polymerization method is a method in which polymerization is conducted with a monomer including the conjugated diene compound in an organic solvent in the presence of a polymerization initiator and, optionally, a randomizer.

At least one of an alkali metal compound and an alkaline earth metal compound can be used as the polymerization initiator. As the alkali metal compound and the alkaline earth metal compound, those usually used as an initiator in anionic polymerization can be used. Specific examples of the polymerization initiator include methyllithium, ethyllithium, n-propyllithium, n-butyllithium, sec-butyllithium, t-butyllithium, 1,4-dilithiobutane, phenyllithium, stillbenlithium, naphthyllithium, sodium naphthyl, potassium naphthyl, di-n-butylmagnesium, di-n-hexylmagnesium, ethoxypotassium, and calcium stearate. Among these, a lithium compound can be preferably used as the polymerization initiator.

The polymerization reaction may be carried out in the presence of a compound obtained by mixing at least any one of the above-mentioned alkali metal compound and alkaline earth metal compound with a compound having a functional group that interacts with an inorganic filler (hereinafter, this compound is also referred to as "initiation modifier"). By carrying out the polymerization in the presence of the initiation modifier, a functional group that interacts with the inorganic filler can be introduced into the polymerization initiation terminal of the polymer (A-1). Further, introducing a functional group that interacts with the inorganic filler into the initiation terminal of the polymer (A-1) is preferable in that the low hysteresis loss performance (fuel efficiency) of vulcanized rubber can be improved.

As used herein, the term "interaction" means that a covalent bond is formed between molecules, or an intermolecular force (e.g., an intermolecular electromagnetic force such as ion-dipole interaction, dipole-dipole interaction, a hydrogen bond, or Van der Waals force) that is weaker than a covalent bond is formed. "Functional group that interacts with the inorganic filler" means a group that has at least one atom that interacts with the inorganic filler. When the polymer composition contains silica as the inorganic filler, the polymer (A-1) preferably has a functional group that interacts with silica. A "functional group that interacts with silica" means a group having at least one atom that interacts with silica (for example, a nitrogen atom, a sulfur atom, a phosphorus atom, an oxygen atom or silicon atom). The silicon atom possessed by the "functional group that interacts with silica" is the silicon atom in the hydrocarbyloxysilyl group.

A reaction product of a lithium compound such as alkyllithium and a nitrogen-containing compound such as a secondary amine compound can be used as the initiation modifier. Examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane.

In the case of carrying out the polymerization in the presence of the initiation modifier, the initiation modifier may be prepared by mixing the alkali metal compound or alkaline earth metal compound and the nitrogen-containing compound in advance, and the polymerization carried out by adding the prepared product to the polymerization system. Alternatively, the polymerization may be carried out by adding the alkali metal compound or alkaline earth metal compound and the nitrogen-containing compound to the polymerization system and mixing them in the polymerization system to prepare the initiation modifier.

The randomizer may be used to adjust the content of 1,2-vinyl bonds in the polymer obtained by the above polymerization. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. The randomizer may be used singly or in combination of two or more types.

The organic solvent used for polymerization may be any organic solvent that is inert to the reaction. Examples of the organic solvent include aliphatic hydrocarbons, alicyclic hydrocarbons, and aromatic hydrocarbons. In particular, the organic solvent is preferably a C3 to C8 hydrocarbon. Specific examples of the C3 to C8 hydrocarbon include n-pentane, isopentane, n-hexane, cyclohexane, propene, 1-butene, isobutene, trans-2-butene, cis-2-butene, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used singly or in combination of two or more types.

In the case of the solution polymerization, the monomer concentration of the reaction solvent is preferably 5 to 50 mass %, more preferably 10 to 30 mass %, from the viewpoint of maintaining the balance between productivity and polymerization controllability. The polymerization reaction temperature is preferably −20° C. to 150° C., more preferably 0 to 120° C., particularly preferably 20 to 100° C. The polymerization reaction is preferably performed under a pressure sufficient to maintain the monomer substantially in a liquid phase. Such a pressure can be achieved by, for example, pressurizing the reactor by use of a gas employed inert to the polymerization reaction.

The 1,2-vinyl content (vinyl content) of the conjugated diene polymer obtained by the above polymerization is preferably 5 to 70 mol %. When the vinyl content is 5 mol % or more, the grip properties tend to be good, and when it is 70 mol % or less, good wear resistance tends to be exhibited. From this point of view, the vinyl content is more preferably 10 mol % or more, and still more preferably 15 mol % or more. Further, the vinyl content is more preferably 60 mol % or less, and still more preferably 50 mol % or less. The vinyl content is a value measured by a $^1$H-NMR apparatus.

By the above polymerization, a conjugated diene polymer having an active terminal can be obtained. To terminate the polymerization, the polymer having an active terminal may be reacted with an alcohol or hydrogen. Also, it is possible to react with a compound having a functional group that interacts with the inorganic filler (hereinafter, also referred to as "terminal modifier") or a coupling agent. By using a terminal modifier when terminating the polymerization, as the polymer (A-1), a modified conjugated diene polymer can be obtained in which the polymerization-end terminal has been modified by the functional group that interacts with the inorganic filler. Further, the polymer (A-1) is preferably a polymer in which a functional group that interacts with the inorganic filler is introduced at the polymerization terminal because a crosslinked body having excellent low hysteresis loss performance can be obtained. As used herein, active terminal means a portion (more specifically, a metal terminal) other than the structure derived from the monomer having a carbon-carbon double bond, which is present at the end of the molecular chain.

The terminal modifier is not particularly limited as long as it is a compound having a functional group that interacts with the inorganic filler and is capable of reacting with the active terminal of the conjugated diene polymer. Among these, the terminal modifier is preferably a compound having one atom selected from the group consisting of a nitrogen atom, a sulfur atom, a phosphorus atom, an oxygen atom, and a silicon atom, and having no active hydrogens bonded to the atom. The terminal modifier is preferably, in particular, a compound having one or more functional groups selected from the group consisting of an amino group, a group having a carbon-nitrogen double bond, a nitrogen-containing heterocyclic group, a phosphino group, a cyclic ether group, a cyclic thioether group, a protected hydroxyl group, a protected thiol group, and a hydrocarbyloxysilyl group. The amino group is preferably a protected primary or secondary amino group, or a tertiary amino group.

Specific examples of the terminal modifier include N,N-bis(trimethylsilyl)aminopropyltrimethoxysilane, N,N-dimethyl-3-(trimethoxysilyl)propylamine, 2,2-dimethoxy-1-(3-trimethoxysilylpropyl)-1,2-azasilolidine, 2,2-dimethoxy-1-phenyl-1,2-azasilolidine, tetraglycidyl-1,3-bisaminomethylcyclohexane, 1,3-dimethyl-2-imidazolidinone, 3-isocyanatopropyltrimethoxysilane, 2,6-tolylenediisocyanate, and diphenylmethane diisocyanate. The terminal modifier may be used singly or in combination of two or more types.

The above-mentioned terminal modification reaction can be carried out as, for example, a solution reaction. This solution reaction may be carried out using a solution including an unreacted monomer after the completion of the polymerization reaction, and the conjugated diene polymer included in the solution isolated and dissolved in an appropriate solvent such as cyclohexane. Further, the terminal modification reaction may be carried out as either a batch type or a continuous type. At this time, the method of adding the terminal modifier is not particularly limited, and examples thereof include a method of adding the terminal modifier all at once, a method of adding the terminal modifier separately, and a method of continuously adding the terminal modifier.

The amount of the terminal modifier to be used may be appropriately set according to the type of the compound used in the reaction, but is preferably 0.1 molar equivalent or more, and more preferably 0.3 molar equivalents or more, relative to the metal atom of the polymerization initiator involved in the polymerization reaction. By setting the amount of the terminal modifier to 0.1 molar equivalent or more, the modification reaction can be sufficiently promoted, and the dispersibility of the inorganic filler can be suitably improved. The reaction temperature at the time of terminal modification is usually the same as the temperature of the polymerization reaction, preferably −20 to 150° C., more preferably 0 to 120° C., and particularly preferably 20 to 100° C. When the temperature of the modification reaction is low, the viscosity of the polymer solution tends to increase. Further, when the temperature of the modification reaction is high, the polymerization active terminal tends to become deactivated. The reaction time at the time of terminal modification is preferably 1 minute to 5 hours, and more preferably 2 minutes to 1 hour.

For the purpose of adjusting the Mooney viscosity of the polymer (A-1), a coupling agent such as silicon tetrachloride or a polyfunctional epoxy compound (for example, tetraglycidyl-1,3-bisaminomethylcyclohexane and the like) may be reacted with the conjugated diene polymer having an active terminal before or after the modification reaction using the terminal modifier, or at the same time as the modification reaction using the terminal modifier. The amount of the coupling agent used can be appropriately set according to the desired Mooney viscosity of the polymer (A-1), the compound used in the reaction, and the like. The amount of the coupling agent is preferably 0.01 to 0.8 molar equivalents relative to the metal atom of the polymerization initiator involved in the polymerization reaction. The coupling agent may be used singly or in combination of two or more types.

Subsequently, the polymer (A-1) can be produced through hydrogenation of the above-produced modified or unmodified conjugated diene-based polymer. The hydrogenation reaction may be performed by any method under any conditions, so long as the resultant conjugated diene-based polymer exhibits a desired percent hydrogenation. Examples of the hydrogenation method include a method involving the use of a hydrogenation catalyst containing an organic titanium compound as a main component; a method involving the use of a catalyst containing an organic compound of iron, nickel, or cobalt and an organic metal compound (e.g., an alkylaluminum); a method involving the use of an organic complex of an organic metal compound of, for example, ruthenium or rhodium; and a method involving the use of a catalyst including a carrier (e.g., carbon, silica, or alumina) on which a metal (e.g., palladium, platinum, ruthenium, cobalt, or nickel) is supported. Industrially preferred is a method involving hydrogenation under mild conditions (low pressure and low temperature) by use of a homogeneous catalyst containing an organic titanium compound only, or containing an organic titanium compound and an organic compound of a metal (lithium, magnesium, or aluminum) (JP-A-S63-4841 and JP-A-H01-37970). Such a hydrogenation method achieves high hydrogenation selectivity to a double bond of butadiene, and is suitable for the object of the present disclosure.

The hydrogenation of the conjugated diene-based polymer is performed in a solvent that is inert to a catalyst and can dissolve the conjugated diene-based polymer. Examples of preferred solvents include aliphatic hydrocarbons, such as n-pentane, n-hexane, and n-octane; alicyclic hydrocarbons, such as cyclohexane and cycloheptane; aromatic hydrocarbons, such as benzene and toluene; and ethers, such as diethyl ether and tetrahydrofuran. These solvents may be used singly. Alternatively, a mixture containing such a solvent as a main component may be used.

In general, the hydrogenation reaction is performed through the following procedure: the conjugated diene-based polymer is maintained at a predetermined temperature in a hydrogen or inert atmosphere, a hydrogenation catalyst is added under stirring or non-stirring, and hydrogen gas is introduced to thereby increase the pressure to a predetermined level. The term "inert atmosphere" refers to an atmosphere that causes no reaction to the participants in the hydrogenation reaction; for example, a helium, neon, or argon atmosphere. Air or oxygen is not preferred, since it causes inactivation of a catalyst through, for example, oxidation of the catalyst. Nitrogen is not also preferred, since it acts as a catalyst poison during the hydrogenation reaction to thereby reduce hydrogenation activity. Most preferably, the hydrogenation reactor is filled with a hydrogen gas atmosphere alone.

The hydrogenation reaction process for producing the hydrogenated conjugated diene-based polymer may be a batch process, a continuous process, or a mixture thereof. In the case where the hydrogenation catalyst is a titanocene diaryl compound, the compound may be added as is to the reaction mixture, or may be added in the form of a solution of the compound in an inert organic solvent. The inert organic solvent used when the catalyst is used in the form of a solution may be any solvent that does not react with the participants in the hydrogenation reaction. Preferably, the inert organic solvent is identical to the solvent used in the hydrogenation reaction. The amount of the catalyst added is 0.02 to 20 mmol relative to 100 g of the conjugated diene-based polymer before hydrogenation.

The polymer (A-1) has a value specified by the following formula (i-1) (hereinafter, also referred to as "value θ") of 0.75 or more and 0.95 or less. By setting θ to 0.75 or more, a crosslinked body having sufficiently high strength and wear resistance can be obtained. For this reason, θ is preferably 0.78 or more, more preferably 0.80 or more, and still more preferably 0.83 or more. Further, from the viewpoint of sufficiently carrying out the crosslinking reaction, θ is 0.95 or less.

$$\theta=(p+(0.5\times r))/(p+q+(0.5\times r)+s) \quad \text{Formula (i-1):}$$

The above formula (i) indicates that the hydrogenation rate of the conjugated diene polymer is 75% or more and 95% or less. That is, the value θ defined by the above formula (i-1) corresponds to the hydrogenation rate of the polymer (A-1). For example, when θ is 0.75, the hydrogenation rate of the polymer (A-1) is 75%. When θ is 0.95, the hydrogenation rate of the polymer (A-1) is 95%. The hydrogenation rate of the polymer can be adjusted based on the duration of the hydrogenation reaction and the like. The hydrogenation rate can be measured by a $^1$H-NMR apparatus.

The polymer (A-1) is preferably produced through a method in which a monomer containing 1,3-butadiene is subjected to solution polymerization in the presence of an alkali metal compound, and the resultant polymer solution is subjected to terminal modification reaction and then hydrogenation reaction. This method is industrially advantageous. In this case, the polymer (A-1) can be isolated by removing the solvent from the above-prepared solution. The polymer can be isolated through a known solvent removal method (e.g., steam stripping) or a drying operation such as thermal treatment.

The polymer (A-1) has a weight average molecular weight (Mw) of preferably $1.0\times10^5$ to $2.0\times10^6$. When the Mw is $1.0\times10^5$ or more, the resultant crosslinked product achieves sufficiently high wear resistance and fuel efficiency. When the weight average molecular weight is $2.0\times10^6$ or less, the present composition exhibits favorable processability, which is preferred. The weight average molecular weight of the polymer (A-1) is more preferably $1.1\times10^5$ or more, still more preferably $1.2\times10^5$ or more. The weight average molecular weight of the polymer (A-1) is more preferably $1.5\times10^6$ or less, still more preferably $1.2\times10^6$ or less. As used herein, the weight average molecular weight of a polymer is measured through gel permeation chromatography (GPC) as reduced to polystyrene, and corresponds to the overall peak weight average molecular weight (total weight average molecular weight).

From the viewpoint of producing a crosslinked product achieving excellent on-ice grip performance, the polymer (A-1) has a glass transition temperature (Tg) of preferably −20° C. or lower, more preferably −30° C. or lower, still more preferably −40° C. or lower, much more preferably −45° C. or lower. The Tg of the polymer (A-1) is, for example, −70° C. or higher. As used herein, the Tg of the polymer is measured through differential scanning calorimetry (DSC) in accordance with ASTM D3418.

Here, by increasing the Tg of the polymer (A-1) blended in the present composition, it can be said that the adhesiveness of the polymer composition before vulcanization can be suppressed to a low level, and the handleability of the polymer composition in the production step can be improved. On the other hand, if the Tg of the polymer (A-1) is increased, the grip performance on ice deteriorates, and the application to winter tires and the like may be restricted. In this respect, since the component (B) is blended together with the polymer (A-1) in the present composition, this is preferable in terms of the point that the adhesiveness of the polymer composition is low even if the Tg of the polymer (A-1) is reduced, and that a vulcanized rubber that exhibits high grip performance on ice can be obtained.

The present composition may contain only the polymer (A-1) as the conjugated diene polymer (A) Also, the present composition may further contain a polymer different from the polymer (A-1), that is, a non-hydrogenated conjugated diene polymer (hereinafter, also referred to as "polymer (A-2)"). Examples of the polymer (A-2) include natural rubber (NR), styrene-butadiene rubber (SBR), butadiene rubber (BR; for example, high-cis BR having 90% or more of cis-1,4 bonds, syndiotactic-1,2-polybutadiene (SPB)-containing BR, and the like), isoprene rubber (IR), styrene isoprene copolymer rubber, and butadiene isoprene copolymer rubber. Of these, the polymer (A-2) is preferably NR and SBR.

The polymer (A-2) can be produced by the same method as described for polymer (A-1) except that the hydrogenation reaction is not carried out in the method for producing polymer (A-1). Regarding the preferable range of the various physical property values, such as the monomer unit constituting the polymer (A-2), the weight average molecular weight of the polymer (A-2), the content of the aromatic vinyl compound unit, the vinyl content, and the glass transition temperature, the description made in relation to polymer (A-1) is incorporated here.

From the perspective of obtaining a crosslinked body having excellent strength and wear resistance, the content of the polymer (A-1) in the present composition is preferably 50% by mass or more relative to the total amount of the conjugated diene polymer (A) included in the present composition. From the above viewpoint, the content of the polymer (A-1) is more preferably 60% by mass or more, and still more preferably 80% by mass or more, relative to the total amount of the conjugated diene polymer (A).

Further, the content of the polymer (A-1) is preferably 30% by mass or more, more preferably 40% by mass or more, still more preferably 60% by mass, and even further preferably 80% by mass or more, with respect to the total amount of the rubber components included in the polymer composition. The conjugated diene polymer (A) may be used singly or in combination of two or more types.

As used herein, the "rubber component" included in the polymer composition means a polymer capable of obtaining a cured product that exhibits rubber elasticity by thermosetting. At room temperature, this cured product undergoes a large deformation by a small force (for example, a two-fold deformation or more when stretched at room temperature), and rapidly returns to almost its original shape when the force is removed.

<Compound (B)>

The compound (B) blended in the present composition is at least one selected from the group consisting of a polysiloxane compound and a fluorine-containing compound.

Polysiloxane Compound

The polysiloxane compound of the compound (B) may be a polymer having a siloxane bond (—Si—O—Si—) in the main skeleton. Examples of the polysiloxane compound include silicone oil, silicone resin, and silicone rubber. Among them, at least one selected from the group consisting of silicone oil and silicone resin is preferable. Specific examples of these include, for example, dimethyl silicone, methylphenyl silicone, methylhydrogen silicone, long-chain alkyl-modified silicone, polyether-modified silicone, fluorine-modified silicone, epoxy-modified silicone, alkoxy-modified dimethyl silicone, alcohol-modified silicone, amino-modified silicone, carboxyl-modified silicone, and epoxy/polyether-modified silicone.

A silicone surfactant may be used. The silicone surfactant used as the polysiloxane compound for preparing the present composition is not particularly limited as long as it is a compound having in one molecule a siloxane structure (hydrophobic moiety) and a moiety (hydrophilic moiety) that is more hydrophilic than the siloxane structure. The silicone surfactant may be nonionic, anionic, cationic, or amphoteric.

Specific examples of the silicone surfactant include polyoxyethylene-modified polysiloxane, polyoxyethylene polyoxypropylene-modified polysiloxane, polyoxyethylene-alkyl co-modified polysiloxane, polyoxyethylene polyoxypropylene-alkyl co-modified polysiloxane, polyglycerin-modified polysiloxane, polyglycerin-alkyl co-modified polysiloxane, and ester-modified polysiloxane.

When preparing the present composition, a polysiloxane compound such as silicone oil or silicone resin may be dispersed in water using a surfactant and used in the form of an emulsion. Such a silicone emulsion can be prepared according to a known method, for example, carrying out a polymerization reaction by an emulsion polymerization method. Such a silicone emulsion can also be obtained as a commercially available product.

Examples of commercially available products of the polysiloxane compound used for the preparation of present composition include KM-740T, KM-860A, Offcon T, KM-9737A, KM-9782, KM-862T, KM-9738A, KM-752T, KM-9739, and X-52-8046 (all manufactured by Shin-Etsu Chemical Co., Ltd.); IE-7045, SH7024, SM7036EX, SM7060EX, IE-7046, SM7025EX, SM490EX, BY22-744EX, FBL-3289, SM7001EX, and DK Q2-2014 (all manufactured by Dow Corning Toray Silicone Co., Ltd.); silicone emulsions such as NP2406, P2003, TS2007, R2701, and R2703 (all manufactured by Wacker Asahikasei Silicone Co., Ltd.); silicone oils such as KF-410, KF-412, and KF-4701 (all manufactured by Shinetsu Chemical Co., Ltd., etc.);

silicone surfactants such as Sepazol 27, 30D, and C-1500 (all manufactured by Lion Specialty Chemicals Co., Ltd.); and fluorine-containing silicone resins such as X-24-9418 (manufactured by Shinetsu Chemical Co., Ltd.). The polysiloxane compound may be used singly or in combination of two or more types.

Fluorine-Containing Compound

A fluorine-containing polymer can be preferably used as the fluorine-containing compound to be blended in the present composition. Examples of the fluorine-containing polymer include fluororesins such as polytetrafluoroethylene, tetrafluoroethylene/perfluoroalkyl vinyl ether copolymer, tetrafluoroethylene/hexafluoropropylene copolymer, tetrafluoroethylene/ethylene copolymer, polyvinylidene fluoride, polychlorotrifluoroethylene, or chlorotrifluoroethylene/ethylene copolymer; a polymer having a fluoroalkyl group in a side chain in which some or all of the hydrogen atoms of the alkyl group are substituted with fluorine atoms (hereinafter, also referred to as "fluoroalkyl group-containing polymer").

The number of carbon atoms of the fluoroalkyl group possessed by the fluoroalkyl group-containing polymer is, from the viewpoint of sufficiently obtaining an improvement in grip performance on ice, preferably 3 or more, and more preferably 4 or more. Further, the carbon number of the fluoroalkyl group is, for example, 20 or less, and preferably 14 or less. In addition, the number of fluorine atoms per fluoroalkyl group is not particularly limited. Due to a high water-repellency effect, a polymer having a perfluoroalkyl group in a side chain can be preferably used as the fluoroalkyl group-containing polymer.

The main skeleton of the fluoroalkyl group-containing polymer is not particularly limited, and examples thereof include a (meth)acrylic polymer and an olefin polymer. In the fluoroalkyl group-containing polymer, the content of the monomer unit having a fluoroalkyl group is preferably 20% by mass or more, and more preferably 30% by mass or more.

Such a fluoroalkyl group-containing polymer can be obtained as a commercial product. Examples of commercially available fluoroalkyl group-containing polymers include Asahi Guard E series (manufactured by AGC Inc.), Unidyne Multi Series (manufactured by Daikin Industries, Ltd.,), and NK Guard S series (manufactured by Nicca Chemical Co., Ltd.).

The fluorine-containing compound may be a compound that functions as a surfactant (a fluorine surfactant). The fluorine surfactant is not particularly limited as long as it is a compound having in one molecule a fluorine-containing structure (hydrophobic moiety) and a moiety (hydrophilic moiety) that is more hydrophilic than the fluorine-containing structure. The fluorine surfactant may be nonionic, anionic, cationic, or amphoteric. Examples of such a fluorine surfactant include Surflon (manufactured by AGC Seimi Chemical Co., Ltd.) and the like.

Among these, a fluoroalkyl group-containing polymer can be preferably used as the fluorine-containing compound in terms of the point that it exhibits excellent water repellency when blended in the present composition, and a polymer having a perfluoroalkyl group in a side chain can be particularly preferably used. The fluorine-containing compound may be used singly or in combination of two or more types.

The content of the compound (B) in the present composition is not particularly limited as long as the effects of the present disclosure can be obtained, but it is preferably 0.001% by mass or more relative to the total content of the present composition. The content of the compound (B) is preferably within the above range in terms of the points that a sufficient water-repellent effect can be obtained, a crosslinked body exhibiting good grip performance on ice can be obtained, and a polymer composition having sufficiently reduced adhesiveness in a non-vulcanized state can be obtained. From this perspective, the content of the compound (B) is more preferably 0.005% by mass or more, still more preferably 0.01% by mass or more, much more preferably 0.05% by mass or more, and particularly preferably 0.1% by mass or more, relative to the total content of the present composition. Further, from the viewpoint of suppressing a decrease in the strength of the crosslinked body and the viewpoint of suppressing a decrease in the vulcanization adhesiveness, the content of the compound (B) is preferably 15% by mass or less, more preferably 7% by mass or less, still more preferably 4% by mass or less, much more preferably 2% by mass or less, and particularly preferably 1% by mass or less, relative to the total content of the present composition.

<Other Components>

The present composition may further contain the following components in addition to the polymer (A) and the compound (B).

Foaming Component

The present composition may contain at least one foaming component selected from the group consisting of a foaming agent, heat-expandable microcapsules, and heat-expandable graphite, for the purpose of further enhancing the grip performance on ice of the obtained crosslinked body (hereinafter, also referred to as "foaming component (C)"). When the present composition contains the foaming component (C), it is possible to improve frictional force on ice due to the surface irregularities formed on the rubber surface after vulcanization. Therefore, the present composition containing the foaming component (C) is particularly suitable for producing winter tires and all-season tires.

The foaming agent is not particularly limited, and various chemical foaming agents such as organic foaming agents and inorganic foaming agents can be used. Specific examples of these include: as an inorganic foaming agent, sodium hydrogencarbonate, ammonium carbonate, and the like; as an organic foaming agent, an azo foaming agent such as diazoaminebenzene, azodicarbonamide, azobisisobutyronitrile, and barium azodicarboxylate, a nitroso foaming agent such as N,N'-dinitrosopentamethylenetetramine, and a hydrazide foaming agent such as p,p'-oxybisbenzenesulfonylhydrazide, benzenesulfonylhydrazide, toluenesulfonylhydrazide, or hydrazodicarbonamide. Further, as the organic foaming agent, a chemical foaming agent-containing resin, which is a composite material of a chemical foaming component such as an azo compound, a nitroso compound, a hydrazide compound, or hydrogen carbonate and a resin may be used.

The foaming agent used to prepare the present composition can be obtained as a commercial product. Specific examples include, by product name, Cell Powder F-10, Cell Powder F-35, Cell Powder F-35L, Cell Powder F-50, Cellular D, Vinihole AC, Vinihole AZ, and Neocellborn (all manufactured by Eiwa Kasei Industry); Cellmic A, Cellmic A-1, Cellmic AN, Cellmic C, Cellmic S, Cellmic SX, and Cellmic SX-H (all manufactured by Sankyo Kasei Co., Ltd.); Sponge paste No. 4 (manufactured by Ouchi Shinko Chemical Industrial Co., Ltd.); Uniform AZ (manufactured by Otsuka Chemical Co., Ltd.), and the like. When a foaming agent is blended in the present composition, a foaming aid may be used in combination. Examples of the foaming aid include the Cell Paste series manufactured by Eiwa Kasei Industry, the Cellton series manufactured by Sankyo Kasei Co., Ltd., and the like.

The heat-expandable microcapsule is a component containing a heat-expandable substance (for example, an aliphatic hydrocarbon) inside an outer shell formed of a thermoplastic resin. Examples of such heat-expandable microcapsules include, by product name, Microspheres F-50D, F-85D, and F100D (all manufactured by Matsumoto Yushi-Seiyaku Co., Ltd.); EXPANCEL 091DU-80 and 092DU-120 (both manufactured by Expancel) and the like.

Thermally expandable graphite consists of particles that contains a substance that vaporizes by heat between layers. Conventionally known products can be used as such thermal expansion graphite. Examples of commercially available products of heat-expandable graphite include Graphcard 160-50N and 160-80N (both manufactured by Tomoe Engineering Co., Ltd.).

The amount of the foaming component (C) in the present composition is not particularly limited as long as the effects of the present disclosure can be obtained, but from the perspective of sufficiently obtaining improved grip performance on ice, the amount of the foaming component (C) is preferably 0.01% by mass or more, more preferably 0.1% by mass or more, and still more preferably 0.5% by mass or more, relative to the total content of the present composition. Further, from the viewpoint of suppressing the occurrence of defects in the production of the crosslinked body, the content of the foaming component (C) is preferably 10% by mass or less, and more preferably 5% by mass or less, relative to the total content of the present composition. The foaming component (C) may be used singly or in combination of two or more types.

Other Rubber Component

The present composition may contain only the conjugated diene polymer (A) as a rubber component. Also, as long as the effects of the present disclosure are not impaired, may also contain, in addition to the conjugated diene polymer (A), a rubber component different from the conjugated diene polymer (A) (hereinafter, also referred to as "other rubber component"). The type of this other rubber component is not particularly limited, and examples thereof include halogenated butyl rubber. The amount of the other rubber component blended is preferably 60% by mass or less, and more preferably 40% by mass or less, relative to the total amount of the rubber components (conjugated diene polymer (A) and other rubber components) included in the polymer composition.

Inorganic Filler

Various reinforcing fillers such as carbon black, silica, clay, and calcium carbonate can be used as the inorganic filler (excluding heat-expandable graphite). Among these, as an inorganic filler different from heat-expandable graphite, the present composition preferably further includes at least one selected from the group consisting of silica and carbon black. Silica is preferable because it has a static ratio and good low hysteresis loss properties, and carbon black is preferable because it has a high effect of improving the strength of the polymer composition and the vulcanized rubber. Examples of silica include wet silica (hydrous silicic acid), dry silica (silicic anhydride), and colloidal silica. Of these wet silica is preferable. Examples of carbon black include furnace black, acetylene black, thermal black, channel black, and graphite. Of these furnace black is particularly preferable.

The present composition preferably has an inorganic filler content of 40 to 150 parts by mass relative to 100 parts by mass of the rubber component included in the polymer composition. The amount of the inorganic filler blended is preferably 40 parts by mass or more because a sufficient improvement in the strength of the vulcanized rubber can be obtained. Further, the amount of the inorganic filler blended is preferably 150 parts by mass or less because the wear resistance of the vulcanized rubber can be sufficiently secured. The amount of the inorganic filler blended is preferably 50 parts by mass or more, and more preferably 55 parts by mass or more, relative to a 100 parts by mass of the total amount of the rubber component. Further, the amount of the inorganic filler blended is preferably 150 parts by mass or less, and more preferably 140 parts by mass or less, based on 100 parts by mass of the total amount of the rubber component.

Cross-Linking Agent

The present composition preferably contains a cross-linking agent. The type of cross-linking agent used is not particularly limited. Specific examples of the cross-linking agent include organic peroxides, phenol resins, sulfur, sulfur compounds, p-quinones, derivatives of p-quinone dioximes, bismaleimide compounds, epoxy compounds, silane compounds, amino resins, polyols, polyamines, triazine compounds, and metal soaps. Of these, the cross-linking agent used is preferably at least one selected from the group consisting of organic peroxides, phenol resins, and sulfur. The cross-linking agent may be used singly or in combination of two or more types.

Examples of the organic peroxide include 1,3-bis(t-butylperoxyisopropyl)benzene, 2,5-dimethyl-2,5-bis(t-butylperoxy)hexyne-3, 2,5-dimethyl-2,5-bis(t-butylperoxy)hexene-3, 2,5-dimethyl-2,5-bis(t-butylperoxy)hexane, 2,2'- bis(t-butylperoxy)-p-isopropylbenzene, dicumyl peroxide, di-t-butyl peroxide, and t-butyl peroxide.

Examples of the phenolic resin include p-substituted phenolic compounds represented by formula (5), o-substituted phenol-aldehyde condensates, m-substituted phenol-aldehyde condensates, and brominated alkylphenol-aldehyde condensates. Of these, p-substituted phenolic compounds are preferred. Such a p-substituted phenolic compound can be prepared through condensation reaction between p-substituted phenol and an aldehyde (preferably formaldehyde) in the presence of an alkali catalyst.

[F3]

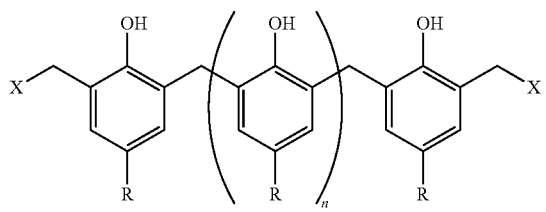

(5)

(In formula (5), X represents a hydroxyl group, a halogenated alkyl group, or a halogen atom; R represents a C1 to C15 monovalent saturated hydrocarbon group; and n is an integer of 0 to 10.)

Examples of commercially available phenolic resins include product name "Tackirol 201" (alkylphenol-formaldehyde resin, manufactured by Taoka Chemical Company, Limited), product name "Tackirol 250-I" (brominated alkylphenol-formaldehyde resin (percent bromination: 4%), manufactured by Taoka Chemical Company, Limited), product name "Tackirol 250-III" (brominated alkylphenol-formaldehyde resin, manufactured by Taoka Chemical Company, Limited), product name "PR-4507" (manufactured by Gun Ei Chemical Industry Co., Ltd.), product name "ST137X" (manufactured by Rohm & Haas Company), product name "Sumilite Resin PR-22193" (manufactured by Sumitomo Durez Co., Ltd.), product name "Tamanol 531" (manufactured by Arakawa Chemical Industries, Ltd.), product name "SP1059," product name "SP1045," product name "SP1055," and product name "SP1056" (manufactured by Schenectady), and product name "CRM-0803" (manufactured by Showa Union Gosei Co., Ltd.). Of these, "Tackirol 201" is preferably used.

The amount of the crosslinking agent is preferably 0.01 to 20 parts by mass, more preferably 0.1 to 15 parts by mass, still more preferably 0.5 to 10 parts by mass, relative to 100 parts by mass of the total amount of the rubber components contained in the polymer composition.

Resin Component

The present composition may further contain a resin component, excluding the compound (B) and the foaming component (C), together with the rubber component. Examples of the type of the resin component include, but are not particularly limited to, polyolefin resins, such as polyethylene and polypropylene. The amount of the resin component is preferably 1 to 50 parts by mass, more preferably 5 to 40 parts by mass, relative to 100 parts by mass of the total amount of the rubber components contained in the polymer composition.

The present composition may contain, in addition to the above-mentioned components, any additive that is commonly used in a rubber composition for producing vulcanized rubber for various applications, such as tires, hoses, vibration-proof products, and belts. Examples of the additive include an antioxidant, zinc oxide, stearic acid, a softener, sulfur, and a vulcanization accelerator. The amount of such an additive incorporated into the polymer composition may be appropriately determined depending on the type of the additive, so long as the effects of the present disclosure are not impaired.

<Crosslinked Body and Tire>

The crosslinked body of the present disclosure can be obtained by crosslinking the above-described polymer composition. When obtaining a rubber molded product as a crosslinked body, usually, the polymer composition is molded into a predetermined shape and then subjected to a crosslinking treatment. The rubber molded product can be produced according to a conventional method. For example, in the production of a tire, the above-described polymer composition is mixed using a mixing machine such as a roll or a mixer, molded into a predetermined shape, placed at a predetermined position according to a conventional method, and vulcanized. As a result, one or both of the tread and the sidewall are formed, and a pneumatic tire can be obtained.

Since the crosslinked body (specifically, vulcanized rubber) of the present disclosure has excellent mechanical strength, it can be applied to various rubber molded products. Specifically, it can be applied to materials for tire treads and sidewalls; rolls and anti-vibration rubber for industrial machinery, equipment, and the like; diaphragms, various hoses such as radiator hoses and air hoses as well as hose covers; seals such as packing, gaskets, weather strips, O-rings and oil seals; belts such as power transmission belts; linings, dust boots, wire harnesses, and material for shoe soles, and the like. Among these, the crosslinked body of the present disclosure is suitably applied to a tire member, an anti-vibration member, a belt member, a roll member, a hose member, a wire harness member, and a shoe sole member, and more suitably applied to a tire member, an anti-vibration member, a roll member, and a belt member.

Further, in addition to exhibiting high strength and high wear resistance, the crosslinked body of the present disclosure has excellent grip performance on ice, and therefore is particularly suitable for tire members. Among tire members, the crosslinked body of the present disclosure is particularly suitable for winter tires and all-season tires. Of those, it is particularly suitable as a material for one or both of a tire tread and a sidewall.

EXAMPLES

The following will specifically describe the present disclosure with reference to examples, but the present disclosure is not limited to these examples. Unless otherwise specified, the word "part(s)" and the symbol "%" described in the examples and comparative examples refer to part(s) by mass and % by mass. The methods for measuring the various physical properties are now shown below.

[Bonded styrene content (% by mass)]: Measured using an $^1$H-NMR apparatus at 400 MHz.

[Vinyl content (mol %)]: Measured using an $^1$H-NMR apparatus at 400 MHz.

[Hydrogenation rate (%)] and [θ]: Determined using a $^1$H-NMR apparatus at 500 MHz.

[First peak weight average molecular weight]: Determined in terms of polystyrene from the retention time corresponding to the apex of the maximum peak of a GPC curve obtained using a gel permeation chromatograph (HLC-8120GPC (product name (manufactured by Tosoh Corporation))).

(GPC Conditions)

Columns: 2 columns, product name "GMHXL" (manufactured by Tosoh Corporation)
Column temperature: 40° C.
Mobile phase: tetrahydrofuran
Flow velocity: 1.0 ml/min
Sample concentration: 10 mg/20 ml

[Total weight average molecular weight]: Determined in terms of polystyrene from a GPC curve obtained using a gel permeation chromatograph (HLC-8120GPC (product name (manufactured by Tosoh Corporation))).

[Glass transition temperature Tg (° C.)]: Measured using a differential scanning calorimetry (DSC) device in accordance with ASTM D3418.

<Production of Hydrogenation Catalyst>

[Synthesis of Catalyst E]

A three-necked flask (volume: 1 L) equipped with a stirrer and a dropping funnel was purged with dry nitrogen, and charged with 200 ml of anhydrous tetrahydrofuran and 0.2 mol of tetrahydrofurfuryl alcohol. Then, an n-butyllithium/cyclohexane solution (0.2 mol) was added dropwise to the three-necked flask at 15° C. to carry out a reaction, thereby obtaining a solution of tetrahydrofurfuryloxylithium in tetrahydrofuran.

Next, a three-necked flask (volume: 1 L) equipped with a stirrer and a dropping funnel was purged with dry nitrogen, and charged with 49.8 g (0.2 mol) of bis(15-cyclopentadienyl)titanium dichloride and 250 ml of anhydrous tetrahydrofuran. Then, the solution of tetrafurfuryloxylithium in tetrahydrofuran obtained by the method described above was added dropwise for about 1 hour while stirring at room temperature. After about 2 hours, a reddish brown liquid was removed by filtration and the insoluble portion was washed with dichloromethane.

Then, the solvent in the filtrate and in the washing solution was removed under reduced pressure to obtain a catalyst E [bis(η5-cyclopentadienyl)titanium (tetrahydrofurfuryloxy)chloride] ("[chlorobis(2,4-cyclopentadienyl)titanium(IV) tetrahydrofurfuryl alkoxide]"). The yield was 95%.

<Production of Conjugated Diene Polymer>

Production Example 1: Synthesis of Conjugated Diene Polymer A-1

An autoclave reaction vessel that had been purged with nitrogen and had an internal volume of 50 liters was charged with 25900 g of cyclohexane, 26 g of tetrahydrofuran, 1273 g of styrene, and 2361 g of 1,3-butadiene. The temperature of the contents of the reaction vessel was adjusted to 45° C., and then a cyclohexane solution including n-butyllithium (39 mmol) was added to initiate polymerization. The polymerization was carried out under adiabatic conditions, and the maximum temperature reached 80° C.

After it had been confirmed that the polymerization conversion rate had reached 99%, 111 g of 1,3-butadiene was added, and polymerization was carried out for a further 5 minutes to obtain a reaction solution including a polymer. The obtained reaction solution was charged with 2 mmol of silicon tetrachloride, the reaction was carried out for 10 minutes, then 28 mmol of N,N-dimethyl-3-(triethoxysilyl)propylamine was added, and the reaction was carried out for 20 minutes.

Next, the temperature of the system was raised to 80° C. or higher, hydrogen was introduced into the system, and then 3.2 g of diethylaluminum chloride, 2.4 g of the catalyst E, and then n-butyllithium (15 mmol) were added. A hydrogenation reaction was carried out by supplying hydrogen so that the hydrogen pressure was maintained at 0.7 MPa or higher and a predetermined integrated hydrogen value was obtained. The reaction solution was then returned to normal temperature and pressure, and extracted from the reaction vessel to obtain a polymer solution.

The obtained polymer solution containing a hydrogenated conjugated diene copolymer was charged with 1.4 g of 2,6-di-tert-butyl-p-cresol. Next, an aqueous solution (temperature: 80° C.) adjusted to pH 8.5 (pH at 80° C. according to a glass electrode method) with ammonia, which is a pH adjuster, was placed in a desolvation tank, the above polymer solution was added (in a proportion of 1000 parts by mass of the above aqueous solution based on 100 parts by mass of the polymer solution), desolvation was performed by steam stripping (steam temperature: 190° C.) for 2 hours at the 95° C. temperature of the liquid phase of the desolvation tank, and drying was carried out using a heat roll adjusted to 110° C. to obtain a conjugated diene polymer A-1. The analytical values of the obtained conjugated diene polymer A-1 are shown in Table 1 below. The obtained conjugated diene polymer A-1 had a first peak weight average molecular weight of $20 \times 10^4$, a weight average molecular weight (total weight average molecular weight) of $34 \times 10^4$, a hydrogenation rate of 93% ($6=0.93$), and a glass transition temperature of −34° C.

Production Examples 2 to 7 and 9: Synthesis of Conjugated Diene Polymers A-2 to A-7 and A-9

Conjugated diene polymers A-2 to A-7 and A-9 were each obtained by performing polymerization in the same manner as in Production Example 1, except that the used raw materials and the hydrogen supply amount were changed as shown in Table 1. Table 2 shows the analytical values of conjugated diene polymers A-2 to A-7 and A-9.

Production Example 8: Synthesis of Conjugated Diene Polymer A-8

An autoclave reaction vessel that had been purged with nitrogen and had an internal volume of 50 liters was charged with 25900 g of cyclohexane, 26 g of tetrahydrofuran, 1273 g of styrene, and 2361 g of 1,3-butadiene. The temperature of the contents of the reaction vessel was adjusted to 45° C., and then a cyclohexane solution including n-butyllithium (39 mmol) was added to initiate polymerization. The polymerization was carried out under adiabatic conditions, and the maximum temperature reached 80° C.

After it had been confirmed that the polymerization conversion rate had reached 99%, 111 g of butadiene was added, and polymerization was carried out for a further 5 minutes to obtain a reaction solution including a polymer. The obtained reaction solution was charged with 2 mmol of silicon tetrachloride, the reaction was carried out for 10 minutes, then 28 mmol of N,N-dimethyl-3-(triethoxysilyl)propylamine was added, and the reaction was carried out for 20 minutes. Next, the temperature of the reaction solution was raised to 80° C. or higher, hydrogen was introduced into the system, then the reaction solution was returned to normal temperature and pressure, and extracted from the reaction vessel to obtain a polymer solution.

The obtained polymer solution containing a conjugated diene copolymer was charged with 1.4 g of 2,6-di-tert-butyl-p-cresol. Next, an aqueous solution (temperature: 80° C.) adjusted to pH 8.5 (pH at 80° C. according to a glass electrode method) with ammonia, which is a pH adjuster, was placed in a desolvation tank, the above polymer solution was added (in a proportion of 1000 parts by mass of the above aqueous solution based on 100 parts by mass of the polymer solution), desolvation was performed by steam stripping (steam temperature: 190° C.) for 2 hours at the 95° C. temperature of the liquid phase of the desolvation tank, and drying was carried out using a heat roll adjusted to 110° C. to obtain a conjugated diene polymer A-8. The obtained conjugated diene polymer A-8 had a first peak weight average molecular weight of $20 \times 10^4$, a weight average molecular weight (total weight average molecular weight) of $34 \times 10^4$, and a glass transition temperature of $-40°$ C. The conjugated diene polymer A-8 had a hydrogenation rate of 0%, $\theta = 0$.

<Production of Polymer Composition and Evaluation of Properties Thereof>

Examples 1 to 22 and Comparative Examples 1 to 4

Using a plastomill (internal capacity: 250 cc) equipped with a temperature control device, a first stage of kneading was carried out by mixing and kneading the conjugated diene polymer, the compound (B), silica, a silane coupling agent, extender oil, stearic acid, zinc oxide, and an antioxidant in the blending formulations of Tables 3 and 4 under conditions of a filling rate of 72% and a rotation speed of 60 rpm. Next, as a second stage of kneading, the formulation obtained above was cooled to room temperature, then the foaming component (C), sulfur, and a vulcanization accelerator were added, and the mixture was kneaded. The kneaded product was molded, and vulcanized at 160° C. for a predetermined time with a vulcanization press. The following properties (1) to (4) were evaluated using the polymer composition, the pre-vulcanization rubber, and the vulcanized rubber. The types and proportions of the conjugated diene polymer, the compound (B), and the foaming component (C) used in each of the examples and comparative examples are as shown in Tables 3 and 4. The numerical values in Tables 3 and 4 represent the blended proportion (parts by mass) of each component.

TABLE 1

| | | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|---|
| Type of polymer | | A-1 | A-2 | A-3 | A-4 | A-5 | A-6 | A-7 | A-8 | A-9 |
| Polymerization formulation | | | | | | | | | | |
| Solvent | | | | | | | | | | |
| :Cyclohexane | (g) | 25900 | 25900 | 25900 | 25900 | 25900 | 25900 | 25900 | 25900 | 25900 |
| Vinyl-content adjusting agent | | | | | | | | | | |
| :Tetrahydrofuran | (g) | 26 | 67 | 67 | 28 | 64 | 18 | 180 | 26 | 26 |
| Monomer | | | | | | | | | | |
| :Styrene | (g) | 1273 | 740 | 370 | 370 | 740 | 370 | 1490 | 1273 | 1273 |
| :Butadiene | (g) | 2361 | 2894 | 3264 | 3264 | 2894 | 3264 | 2144 | 2361 | 2361 |
| :Additional butadiene | (g) | 111 | 111 | 111 | 111 | 111 | 111 | 111 | 111 | 111 |
| Polymerization initiator | | | | | | | | | | |
| :n-butyllithium | (mmol) | 39 | 39 | 39 | 39 | 39 | 39 | 39 | 39 | 39 |
| :Compound A | (mmol) | — | — | 27 | — | — | — | — | — | — |
| Amine-based modifier | | | | | | | | | | |
| :Compound B | (mmol) | 28 | 28 | 28 | 28 | 28 | 28 | 28 | 28 | 28 |
| Coupling agent | | | | | | | | | | |
| :Compound C | (mmol) | 2 | 2 | 2 | 2 | 2 | 2 | 2 | 2 | 2 |

In Table 1, the abbreviations of the compounds represent the following compounds.
  Compound A: Piperidine
  Compound B: N,N-dimethyl-3-(triethoxysilyl)propylamine
  Compound C: Silicon tetrachloride
In Table 1, "-" indicates that the compound in the corresponding column was not used.

TABLE 2

| | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|
| Type of polymer | A-1 | A-2 | A-3 | A-4 | A-5 | A-6 | A-7 | A-8 | A-9 |
| Bonded styrene content (wt %) | 34 | 20 | 10 | 10 | 20 | 10 | 40 | 34 | 34 |
| Vinyl content (mol %) | 27 | 35 | 35 | 30 | 33 | 24 | 48 | 27 | 27 |
| Percent hydrogenation | 93 | 95 | 92 | 88 | 89 | 87 | 87 | 0 | 60 |
| $\theta$ | 0.93 | 0.95 | 0.92 | 0.88 | 0.89 | 0.87 | 0.87 | 0 | 0.60 |
| First peak weight average molecular weight ($\times 10^4$) | 20 | 21 | 22 | 20 | 21 | 20 | 19 | 20 | 20 |
| Total weight average molecular weight ($\times 10^4$) | 34 | 32 | 38 | 30 | 32 | 30 | 28 | 34 | 37 |
| Glass transition temperature (° C.) | −34 | −46 | −52 | −52 | −45 | −48 | −28 | −40 | −33 |

<Evaluation of Properties>
(1) Tensile Strength

A tensile test was conducted in accordance with JIS K6251: 2010 using vulcanized rubber as a measurement sample. Here, using a No. 3 type dumbbell as a test sample, the stress at break (TB) and the elongation at break (EB) were measured at room temperature. The larger the values of TB and EB, the larger the breaking strength, indicating that the mechanical strength of the material is high and good. The evaluation was performed using the TB value, and the result is shown based on a value standardized so that the TB value of Comparative Example 2 was 100.

(2) Grip Performance on Ice

Using vulcanized rubber with a diameter of 50 mm and a thickness of 10 mm as a measurement sample, the sample was pressed against fixed ice and rotated at a surface pressure of 12 kgf/cm$^2$ and a sample rotation main speed of 20 cm/sec in a −2° C. environment. The generated frictional force was detected using a load cell, and a dynamic friction coefficient μ was calculated. The evaluation was performed using the dynamic friction coefficient μ, and the result is shown based on a value standardized so that the dynamic friction coefficient μ of Comparative Example 2 was 100.

(3) Adhesiveness in the Steps

The compound (B) was added to a polymer solution including the conjugated diene polymer after the addition of 2,6-di-tert-butyl-p-cresol obtained in Production Example 2 so as to obtain the blending ratios of the compound (B) to the conjugated diene polymer (A) in each of the examples and comparative examples. Then, desolvation was carried out under the steam stripping conditions of the production example. The desolvated rubber composition was placed on a SUS wire mesh and heated in a hot air constant temperature bath at 120° C. for 1 hour to perform a hot air drying treatment. The state of the dried rubber composition when it was recovered from the SUS wire mesh was observed and evaluated according to the following criteria.

(Evaluation Criteria)

A: 99% or more of the rubber composition could be recovered, and no adhesion of the rubber composition to the wire mesh was observed.

B: 97% or more and less than 99% of the rubber composition could be recovered, and not much of the rubber composition adhered to the wire mesh.

C: 95% or more and less than 97% of the rubber composition could be recovered, and a large amount of the rubber composition adhered to the wire mesh.

D: Less than 95% of the rubber composition could be recovered, and a very large amount of the rubber composition adhered to the wire mesh.

In the case of a judgment of criteria A to C, it can be determined that adhesion of the rubber composition to the equipment is at a practical level in the drying step by a band dryer, an extruder, or the like during production of the rubber composition. In the case of a judgment of criteria D, it can be determined that the adhesion of the rubber composition to the equipment is not at a practical level.

(4) Vulcanization Adhesiveness of Members

A sheet was prepared using the pre-vulcanization rubber of each example and comparative example, laminated with a pre-vulcanization sheet containing natural rubber as a main component, and then vulcanized under the conditions of a temperature of 160° C. and a time of 30 minutes to obtain a laminated vulcanized product. A sample having a No. 3 type dumbbell shape was taken from the laminated vulcanized product, and a strain fatigue test was repeated using a constant strain elongation fatigue tester at an elongation rate of 100% and a repetition rate of 300 cpm until break. The cross-sectional state at the time of break was observed and evaluated according to the following criteria.

(Evaluation Criteria)

A: When the strip broke, there was no peeling between the layers.

B: When the strip broke, there was peeling between some of the layers.

C: When the strip broke, complete peeling occurred between the layers.

D: Complete peeling occurred between the layers before the strip broke.

In the case of a judgment of criteria A to C, it can be determined that the vulcanization adhesiveness with other members during tire production is at a practical level. In the case of a judgment of criteria D, it can be determined that the vulcanization adhesiveness with other members is not at a practical level.

Tables 3 and 4 show the results of the evaluation of the properties of Examples 1 to 22 and Comparative Examples 1 to 4.

TABLE 3

| | | Example 1 | Example 2 | Example 3 | Example 4 | Example 5 | Example 6 | Example 7 |
|---|---|---|---|---|---|---|---|---|
| Compounding formulation | Conjugated diene-based polymer (A) | A-1 (100) | A-2 (100) | A-3 (100) | A-4 (100) | A-5 (100) | A-6 (100) | A-7 (100) |
| | Compound (B) | B-1 (1) | B-1 (1) | B-1 (1) | B-1 (1) | B-1 (1) | B-1 (1) | B-1 (1) |
| | Foaming component (C) | — | — | — | — | — | — | — |
| | Silica *1) | 75 | 75 | 75 | 75 | 75 | 75 | 75 |
| | Silane coupling agent *2) | 6.0 | 6.0 | 6.0 | 6.0 | 6.0 | 6.0 | 6.0 |
| | Extender oil *3) | 34 | 34 | 34 | 34 | 34 | 34 | 34 |
| | Stearic acid | 2.0 | 2.0 | 2.0 | 2.0 | 2.0 | 2.0 | 2.0 |
| | Zinc oxide | 3.0 | 3.0 | 3.0 | 3.0 | 3.0 | 3.0 | 3.0 |
| | Antioxidant *4) | 1.0 | 1.0 | 1.0 | 1.0 | 1.0 | 1.0 | 1.0 |
| | Vulcanization accelerator CZ *5) | 1.8 | 1.8 | 1.8 | 1.8 | 1.8 | 1.8 | 1.8 |
| | Vulcanization accelerator D *6) | 1.5 | 1.5 | 1.5 | 1.5 | 1.5 | 1.5 | 1.5 |
| | Sulfur | 1.5 | 1.5 | 1.5 | 1.5 | 1.5 | 1.5 | 1.5 |
| Evaluation | Tensile strength | 185 | 197 | 179 | 152 | 155 | 151 | 148 |
| | Grip performance on ice | 117 | 119 | 127 | 127 | 125 | 123 | 107 |
| | Adhesiveness in the steps | A | A | B | B | B | B | A |
| | Vulcanization adhesiveness of members | B | B | B | B | B | B | B |

TABLE 3-continued

|  |  | Example 8 | Example 9 | Example 10 | Example 11 | Example 12 | Example 13 |
|---|---|---|---|---|---|---|---|
| Compounding formulation | Conjugated diene-based polymer (A) | A-4 (100) | A-4 (100) | A-4 (100) | A-4 (100) | A-4 (100) | A-4 (100) |
|  | Compound (B) | B-2 (1) | B-3 (1) | B-4 (1) | B-5 (1) | B-6 (1) | B-7 (1) |
|  | Foaming component (C) | — | — | — | — | — | — |
|  | Silica *1) | 75 | 75 | 75 | 75 | 75 | 75 |
|  | Silane coupling agent *2) | 6.0 | 6.0 | 6.0 | 6.0 | 6.0 | 6.0 |
|  | Extender oil *3) | 34 | 34 | 34 | 34 | 34 | 34 |
|  | Stearic acid | 2.0 | 2.0 | 2.0 | 2.0 | 2.0 | 2.0 |
|  | Zinc oxide | 3.0 | 3.0 | 3.0 | 3.0 | 3.0 | 3.0 |
|  | Antioxidant *4) | 1.0 | 1.0 | 1.0 | 1.0 | 1.0 | 1.0 |
|  | Vulcanization accelerator CZ *5) | 1.8 | 1.8 | 1.8 | 1.8 | 1.8 | 1.8 |
|  | Vulcanization accelerator D *6) | 1.5 | 1.5 | 1.5 | 1.5 | 1.5 | 1.5 |
|  | Sulfur | 1.5 | 1.5 | 1.5 | 1.5 | 1.5 | 1.5 |
| Evaluation | Tensile strength | 155 | 154 | 154 | 159 | 148 | 150 |
|  | Grip performance on ice | 123 | 121 | 127 | 124 | 122 | 120 |
|  | Adhesiveness in the steps | B | B | B | B | B | B |
|  | Vulcanization adhesiveness of members | B | B | B | B | B | B |

TABLE 4

|  |  | Example 14 | Example 15 | Example 16 | Example 17 | Example 18 | Example 19 | Example 20 |
|---|---|---|---|---|---|---|---|---|
| Compounding formulation | Conjugated diene-based polymer (A) | A-4 (100) | A-4 (100) | A-4 (100) | A-4 (100) | A-2 (100) | A-2 (100) | A-2 (100) |
|  | Compound (B) | B-8 (1) | B-1 (10) | B-1 (0.2) | B-1 (0.001) | B-1 (1) | B-1 (1) | B-1 (1) |
|  | Foaming component (C) | — | — | — | — | C-1 (5) | C-2 (5) | C-3 (5) C-4 (5) |
|  | Silica *1) | 75 | 75 | 75 | 75 | 75 | 75 | 75 |
|  | Silane coupling agent *2) | 6.0 | 6.0 | 6.0 | 6.0 | 6.0 | 6.0 | 6.0 |
|  | Extender oil *3) | 34 | 34 | 34 | 34 | 34 | 34 | 34 |
|  | Stearic acid | 2.0 | 2.0 | 2.0 | 2.0 | 2.0 | 2.0 | 2.0 |
|  | Zinc oxide | 3.0 | 3.0 | 3.0 | 3.0 | 3.0 | 3.0 | 3.0 |
|  | Antioxidant *4) | 1.0 | 1.0 | 1.0 | 1.0 | 1.0 | 1.0 | 1.0 |
|  | Vulcanization accelerator CZ *5) | 1.8 | 1.8 | 1.8 | 1.8 | 1.8 | 1.8 | 1.8 |
|  | Vulcanization accelerator D *6) | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 |
| Evaluation | Tensile strength | 146 | 125 | 181 | 188 | 175 | 172 | 173 |
|  | Grip performance on ice | 121 | 132 | 112 | 115 | 131 | 134 | 131 |
|  | Adhesiveness in the steps | B | A | B | C | A | A | A |
|  | Vulcanization adhesiveness of members | B | C | A | A | B | B | B |

|  |  | Example 21 | Example 22 | Comparative Example 1 | Comparative Example 2 | Comparative Example 3 | Comparative Example 4 |
|---|---|---|---|---|---|---|---|
| Compounding formulation | Conjugated diene-based polymer (A) | A-2 (100) | A-2 (100) | A-4 (100) | A-8 (100) | A-8 (100) | A-9 (100) |
|  | Compound (B) | B-1 (1) | B-1 (1) | — | — | B-1 (1) | B-1 (1) |
|  | Foaming component (C) | C-5 (5) | C-6 (5) | — | — | — | — |
|  | Silica *1) | 75 | 75 | 75 | 75 | 75 | 75 |
|  | Silane coupling agent *2) | 6.0 | 6.0 | 6.0 | 6.0 | 6.0 | 6.0 |
|  | Extender oil *3) | 34 | 34 | 34 | 34 | 34 | 34 |
|  | Stearic acid | 2.0 | 2.0 | 2.0 | 2.0 | 2.0 | 2.0 |
|  | Zinc oxide | 3.0 | 3.0 | 3.0 | 3.0 | 3.0 | 3.0 |
|  | Antioxidant *4) | 1.0 | 1.0 | 1.0 | 1.0 | 1.0 | 1.0 |
|  | Vulcanization accelerator CZ *5) | 1.8 | 1.8 | 1.8 | 1.8 | 1.8 | 1.8 |
|  | Vulcanization accelerator D *6) | 1.5 | 1.5 | 1.5 | 1.5 | 1.5 | 1.5 |
|  | Sulfur | 1.5 | 1.5 | 1.5 | 1.5 | 1.5 | 1.5 |
| Evaluation | Tensile strength | 171 | 168 | 190 | 100 | 97 | 101 |
|  | Grip performance on ice | 132 | 134 | 100 | 100 | 112 | 110 |
|  | Adhesiveness in the steps | A | A | D | B | B | B |
|  | Vulcanization adhesiveness of members | B | B | A | A | B | B |

The details of the compound (B) and the foaming component (C) in Tables 3 and 4 are as follows.

B-1: Silicone oil emulsion, product name "KM862T", manufactured by Shinetsu Chemical Co., Ltd.
B-2: Silicone oil emulsion, product name "KM9737A", manufactured by Shinetsu Chemical Co., Ltd.
B-3: Silicone emulsion, product name "SM7036", manufactured by Dow Corning Toray Silicone Co., Ltd.
B-4: Modified silicone oil emulsion, product name "R2701", manufactured by Wacker Asahikasei Silicone Co., Ltd.
B-5: Silicone surfactant, product name "Sepazol C-1500", manufactured by Lion Specialty Chemicals Co., Ltd.
B-6: Fluorine emulsion, product name "Unidyne TG-5546", manufactured by Daikin Industries, Ltd.,
B-7: Fluorine emulsion, product name "Asahi Guard AG-E061", manufactured by AGC Inc.
B-8: Fluorosilicone, product name "X-24-9418", manufactured by Shin-Etsu Chemical Co., Ltd.
C-1: Chemical foaming agent, product name "Cellmic AN", manufactured by Sankyo Kasei Co., Ltd.
C-2: Chemical foaming agent-containing resin (foamed particles), product name "Cell Powder F50", manufactured by Eiwa Kasei Industry
C-3: Chemical foaming agent, product name "Cellular D", manufactured by Eiwa Kasei Industry
C-4: Foaming aid, product name "Cell Paste 101", manufactured by Eiwa Kasei Industry
C-5: Thermally expandable microcapsules, product name "Microsphere F100D", manufactured by Eiwa Kasei Industry
C-6: Expanded graphite, product name "Graphcard 160-50N", manufactured by Tomoe Engineering Co., Ltd.

The details of each of the components *1) to *6) used in Tables 3 and 4 are as follows.

1) ZEOSIL 1165MP manufactured by Rhodia Silcea
2) Si75 manufactured by Evonik Industries AG
3) Process oil T-DAE, manufactured by JX Nippon Oil & Energy USA Inc.
4) Ozonone 6C, manufactured by Seiko Chemical Co., Ltd.
5) Nocceler CZ, manufactured by Ouchi Shinko Chemical Industrial Co., Ltd.
6) Nocceler D, manufactured by Ouchi Shinko Chemical Industrial Co., Ltd.

In Tables 3 and 4, the numerical values in parentheses represent the blended amounts (parts by mass) when the polymer composition was prepared, and "-" indicates that the compound in the corresponding column was not used.

As shown in Tables 3 and 4, the polymer compositions (Examples 1 to 22) containing a polymer (A-1) having a hydrogenation ratio of 75% or more as the conjugated diene polymer (A) and the compound (B) exhibited sufficiently high values in the indices for tensile strength and grip performance on ice, and the evaluation of adhesiveness in the steps was A, B or C, showing a good balance among the various properties. Further, Examples 1 to 22 also maintained the vulcanization adhesiveness while having good adhesiveness during the steps.

In contrast, in Comparative Example 1 containing the polymer (A-1) but not the compound (B), the evaluation of adhesiveness in the steps was "D". Further, in Comparative Examples 2 to 4 not containing the polymer (A-1), the evaluation of the tensile strength was significantly lower than in Examples 1 to 22.

From the above results, it is clear that the polymer composition containing the polymer (A-1) and the compound (B) can suppress the adhesiveness of the polymer composition to a low level and improve grip performance on ice, while maintaining a high tensile strength.

What is claimed is:

1. A polymer composition, comprising:
   a conjugated diene polymer (A); and
   a compound (B) comprising at least one compound selected from the group consisting of a polysiloxane compound and a fluorine-containing compound,
   wherein the conjugated diene polymer (A) comprises a polymer (A-1) including a first structural unit of formula (1), a second structural unit of formula (2), a third structural unit of formula (3), and a fourth structural unit of formula (4),

(1)

(2)

(3)

(4)

where a molar ratio of the first structural unit, the second structural unit, the third structural unit, and the fourth structural unit are p, q, r, and s, respectively, and $0.75 \leq (p+(0.5 \times r))/(p+q+(0.5 \times r)+s) \leq 0.95$,
wherein the polymer (A-1) is a copolymer of a conjugated diene compound and an aromatic vinyl compound and has a glass transition temperature of −45° C. or lower.

2. The polymer composition according to claim 1, wherein a proportion of the polymer (A-1) in the conjugated diene polymer (A) is 50% by mass or more.

3. The polymer composition according to claim 1, wherein the polymer (A-1) has a weight average molecular weight in terms of polystyrene measured by a gel permeation chromatograph of $1.0 \times 10^5$ to $2.0 \times 10^6$.

4. The polymer composition according to claim 1, wherein a content of the compound (B) is 0.01 to 5% by mass relative to the total composition.

5. The polymer composition according to claim 1, further comprising:
   at least one selected from the group consisting of a foaming agent, heat-expandable microcapsules, and heat-expandable graphite.

6. The polymer composition according to claim 1, further comprising:
   a cross-linking agent.

7. The polymer composition according to claim 1, further comprising:
   an inorganic filler different from heat-expandable graphite.

8. A crosslinked body obtained by a process comprising curing the polymer composition of claim 1.

9. A tire, comprising;
   a tread; and
   a sidewall,
   wherein at least one of the tread and the sidewall is obtained by a process comprising curing the polymer composition of claim 1.

10. The polymer composition according to claim 1, wherein a content of the polymer (A-1) is 80% by mass or more with respect to a total amount of rubber components comprised in the polymer composition.

11. The polymer composition according to claim 2, wherein the polymer (A-1) has a weight average molecular weight in terms of polystyrene measured by a gel permeation chromatograph of $1.0 \times 10^5$ to $2.0 \times 10^6$.

12. The polymer composition according to claim 2, wherein a content of the compound (B) is 0.01 to 5% by mass relative to the total composition.

13. The polymer composition according to claim 2, further comprising:
   at least one selected from the group consisting of a foaming agent, heat-expandable microcapsules, and heat-expandable graphite.

14. The polymer composition according to claim 2, further comprising:
   an inorganic filler different from heat-expandable graphite.

15. A tire, comprising:
   a tread; and
   a sidewall,
   wherein at least one of the tread and the sidewall is obtained by a process comprising curing the polymer composition of claim 2.

16. The polymer composition according to claim 2, wherein a content of the polymer (A-1) is 80% by mass or more with respect to a total amount of rubber components comprised in the polymer composition.

17. The polymer composition according to claim 1, wherein a content of a structure unit derived from the aromatic vinyl compound is 3 to 45% by mass relative to a total mass of the polymer (A-1).

* * * * *